Sept. 9, 1924.
J. E. McBRIDE
1,507,888
SECTIONAL MOLD OPERATING DEVICE
Filed Sept. 4, 1917      2 Sheets-Sheet 1
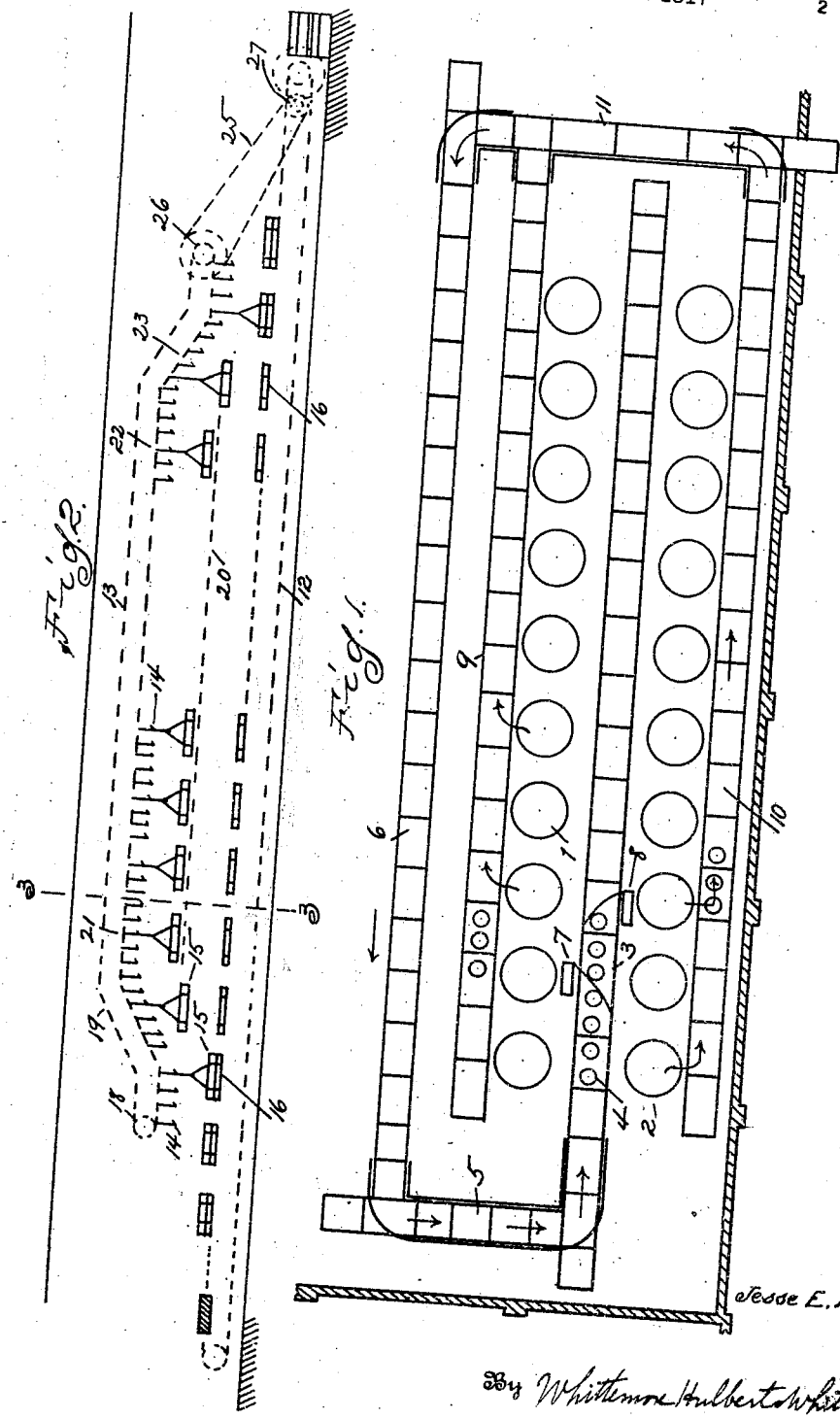
Inventor
Jesse E. McBride
By Whittemore Hulbert & Whittemore
Attorneys Sept. 9, 1924.
J. E. McBRIDE
1,507,888
SECTIONAL MOLD OPERATING DEVICE
Filed Sept. 4, 1917
2 Sheets-Sheet 2
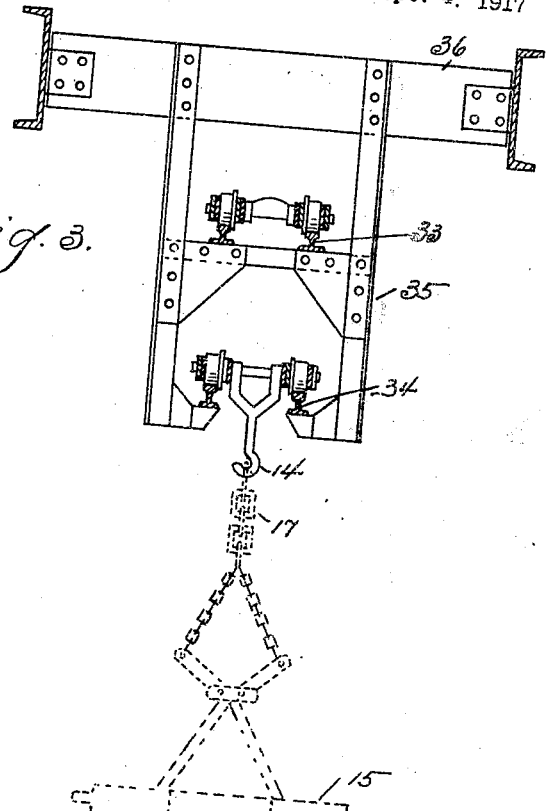
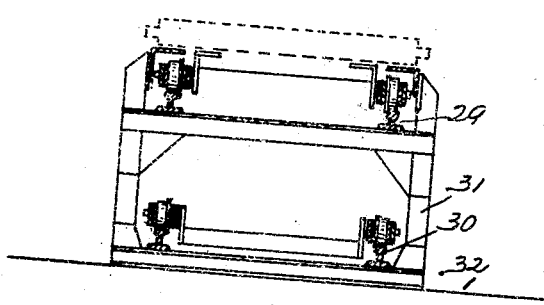
Inventor
Jesse E. McBride
By Whittemore Hulbert & Whittemore
Attorneys Patented Sept. 9, 1924.

1,507,888

UNITED STATES PATENT OFFICE.

JESSE E. McBRIDE, OF DETROIT, MICHIGAN, ASSIGNOR TO PALMER-BEE COMPANY, OF DETROIT, MICHIGAN, A CORPORATION OF MICHIGAN.

SECTIONAL MOLD-OPERATING DEVICE.

Application filed September 4, 1917. Serial No. 189,668.

*To all whom it may concern:*

Be it known that I, JESSE E. McBRIDE, a citizen of the United States of America, residing at Detroit, in the county of Wayne and State of Michigan, have invented certain new and useful Improvements in Sectional Mold-Operating Devices, of which the following is a specification, reference being had therein to the accompanying drawings.

This invention relates to mold-operating devices, especially such as are adapted for the curing rooms of rubber plants, and refers more particularly to the provision of an apparatus for advancing the molds and automatically lifting and holding one section of the mold spaced from the other during at least a portion of the travel.

In the handling of molds such as are employed in connection with the vulcanizing of automobile tires, it is necessary to separate the mold sections for the purpose of removing the cured tires, cleaning the molds and replacing the removed section back upon the other section. Because of the fact that the molds are not interchangeable it is essential that the cover-section of each of the molds be returned back upon the particular lower mold section from which it was removed. Therefore the present invention contemplates an apparatus whereby the mold sections are not only separated but are caused to so travel that the cover or upper section removed from any mold will be automatically returned back upon that particular mold from which it was removed; to provide a construction in which endless conveyers are employed, one of which is offset with relation to the other through a part of its travel so as to advance the molds in separated relation, the conveyers being driven at such speed that while one of them travels through a longer orbit than the other, the mold section carried by it will reach the return point at the same time as the section carried by the other conveyer; to so construct and arrange the parts that one of the securing devices for connecting the mold section to be lifted to the upper conveyer will always be in registration or substantially in registration with the mold section to be lifted irrespective of the spacing of the molds on the lower conveyer.

The invention also resides in such other features of construction and arrangements and combinations of parts as will more fully hereinafter appear.

In the drawings:

Figure 1 is a diagrammatic top plan view of a conveyer system to which my invention is applied;

Figure 2 is a side elevational view of the conveyer which separates the mold sections;

Figure 3 is an enlarged vertical section on the line 3—3 of Figure 2.

Figure 4 is an enlarged vertical section through the lower conveyer.

Describing in detail the particular construction shown in the drawings and referring first to the general system illustrated in Figure 1, the vulcanizing heaters are arranged in parallel rows 1 and 2, between which there extends a main feed conveyer 3 on which the molds 4 are carried. The supply of molds to this main feed conveyer 3 is furnished by the transverse end conveyer 5 which in turn receives the filled molds from the work conveyer 6. The molds are transferred to the various heaters by suitable deflecting devices 7 and 8 and after being subjected to the heat treatment for the desired length of time, they are taken from the heaters and placed upon return conveyers 9 and 10 which carry them in the direction of the arrows to the end conveyer 11. From the latter they are automatically returned onto the work conveyer 6, or rather onto the lower conveyer 12 of the work conveyer which is formed of two complete endless conveyers 12 and 13. The latter is spaced above the conveyer 12 and is provided with a plurality of hooks 14 which can be engaged with and carry the upper mold section 15 in spaced relation to the lower mold section 16 in the following manner:

At the point marked 18 the upper conveyer 13 is spaced from the lower conveyer 12 a sufficient distance to permit one of the hooks 14 to be engaged with a link on the lifting chain 17 while the mold cover-section 15 is still in place on the lower mold section 16. It will be noticed that there are a large number of the hooks 14, that is, the series of hooks 14 are closely spaced so that there will always be one of the hooks which is substantially straight over the cover-section to be lifted. This provision of a large number of hooks or other securing devices on the upper conveyer is an important feature for the following reasons: In removing the molds from the heaters 1 and 2 and placing them on the return conveyers 9 and 10 the molds will be placed on the conveyers at different distances from each other. Some of them will be closely bunched and others separated a greater distance apart. By providing the upper conveyer with closely spaced hooks or other securing devices, the cover section to be lifted can always be engaged by one of the securing devices irrespective of the spacing of the molds on the lower conveyer. This makes the lifting devices adaptable to a continuously operating apparatus and any number of heaters can be employed, grouped in one or more lines. Just before the molds reach the point marked 18, the upper mold section 15 is loosened from the lower mold section 16 by prying them apart; then as the conveyer 13 moves upward through the incline 19 it will gradually lift the upper mold section 15 away from the lower mold section 16 and carry it above the safety platform 20. From this point the molds proceed in spaced relation from the point marked 21 to the point marked 22 so as to permit the operator to remove the tire from the lower mold section, cleanse the mold sections and refill the lower mold section. During all of this time the mold sections are being continuously advanced in spaced relation, toward the conveyer 5. As the upper conveyer reaches the incline 23 the cover-section 15 is gradually let down toward the lower mold section 16 until they come together again at the point maked 24.

It will be noticed that because of its upwardly offset central portion the conveyer 13 is compelled to travel through a longer orbit than the corresponding portions of the conveyer 12. As, however, it is necessary to return each cover mold section back upon the particular lower section from which it was removed, I accomplish this result by driving the conveyer 13 at a greater speed than the conveyer 12 so that in moving from the point 18 to the point 23 the upper section will travel in such ratio to the lower section that it will reach the return point at the same time as the lower section 16. The two conveyers are driven in timed relation to each other by means of the chain 25 extending over sprockets 26 and 27. The lower conveyer travels over tracks 29 and 30 mounted in a supporting frame 31 on the floor 32 while the upper conveyer travels on tracks 33 and 34 carried by a suspension frame 35 which depends from the ceiling or roof support 36. Various changes, however, in the details of construction and arrangement of these conveyers and various other parts of the apparatus can be made within the scope of my invention.

What I claim as my invention is:

1. A combined conveyer and cover-operating device comprising an endless conveyer upon which tire mold or the like are placed, said molds having removable upper sections, of a second endless conveyer positioned above the first and having its center portion arranged in a higher plane than its end portions, said upper conveyer having a plurality of members within a space squal to that occupied by a mold upon said first-mentioned conveyer and engageable with said upper sections irrespective of the spacing of the molds upon said first-mentioned conveyer and adapted to lift said upper sections and carry the same suspended during a predetermined period of travel.

2. A combined conveyer and cover-operating device comprising an endless conveyer upon which sectional molds are placed, of a second endless conveyer positioned above the first and having its center portion arranged in a plane higher than its end portions, said upper conveyer having a plurality of closely spaced hooks within a space equal to that occupied by a mold upon said first-mentioned conveyer and engageable with said upper sections and adapted to lift the same and carry them suspended during a predetermined period of travel, and means for driving said conveyers in such timed relation that said upper sections are returned back onto the particular lower sections of the molds from which the upper sections are removed.

3. A sectional mold operating device comprising a pair of conveyers, one of which is adapted to carry the sectional molds forward, and the other of which is provided with a plurality of closely spaced securing devices within a space equal to that occupied by a mold upon the first-mentioned conveyer and adapted to be connected to the upper sections of the molds on the first-mentioned conveyer irrespective of the spacing thereof, said conveyers having vertically diverging portions whereby the sections of the molds are automatically separated.

In testimony whereof I affix my signature.

JESSE E. McBRIDE.